United States Patent
Drolet et al.

(10) Patent No.: US 12,332,125 B2
(45) Date of Patent: Jun. 17, 2025

(54) METHOD AND APPARATUS TO MEASURE GAS TURBINE COMPRESSOR EXIT TEMPERATURE

(71) Applicant: Pratt & Whitney Canada Corp., Longueuil (CA)

(72) Inventors: Martin Drolet, Saint-Amable (CA); Sebastien Lortie, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/350,378

(22) Filed: Jul. 11, 2023

(65) Prior Publication Data
US 2025/0020521 A1    Jan. 16, 2025

(51) Int. Cl.
G01K 13/024    (2021.01)
F02C 7/32    (2006.01)
G01K 1/14    (2021.01)
G01K 7/02    (2021.01)

(52) U.S. Cl.
CPC .............. G01K 13/024 (2021.01); F02C 7/32 (2013.01); G01K 1/14 (2013.01); G01K 7/02 (2013.01); *F05D 2260/83* (2013.01)

(58) Field of Classification Search
CPC .......... F02C 7/32; F01D 17/08; F01D 17/085; G01K 13/024
See application file for complete search history.

(56) References Cited

U.S. PATENT DOCUMENTS

| | | | |
|---|---|---|---|
| 4,744,670 A | 5/1988 | Janssen | |
| 7,328,623 B2 | 2/2008 | Slagle et al. | |
| 9,194,755 B2 | 11/2015 | Gaully et al. | |
| 9,983,038 B2* | 5/2018 | Kamiya | G01F 5/00 |
| 11,396,824 B2 | 7/2022 | Fechner | |
| 2020/0231307 A1* | 7/2020 | Best | G01L 19/0654 |
| 2020/0284693 A1* | 9/2020 | Barker | G01K 13/02 |
| 2020/0291857 A1 | 9/2020 | Tang et al. | |
| 2020/0318488 A1* | 10/2020 | Kamrath | F01D 9/047 |
| 2021/0003458 A1* | 1/2021 | Durocher | G01K 13/02 |
| 2021/0088401 A1* | 3/2021 | Hauer | G01L 19/0038 |

FOREIGN PATENT DOCUMENTS

CN    115356113 A    11/2022

OTHER PUBLICATIONS

European Search Report for EP Application No. 24188122.6 dated Feb. 18, 2025.

* cited by examiner

*Primary Examiner* — Andrew H Nguyen
(74) *Attorney, Agent, or Firm* — Carlson, Gaskey & Olds, P.C.

(57) ABSTRACT

A gas turbine engine includes a compressor, a combustor and a turbine. A compressor section has an exit upstream of the combustor. A temperature probe extends through a compressor exit housing surrounding the compressor section exit. The temperature probe taps air downstream of the exit into a probe body having a passage leading to a temperature sensor. There is a controlled leakage also allowing air from within the compressor exit housing to leak. A method and a test probe are also disclosed.

14 Claims, 3 Drawing Sheets

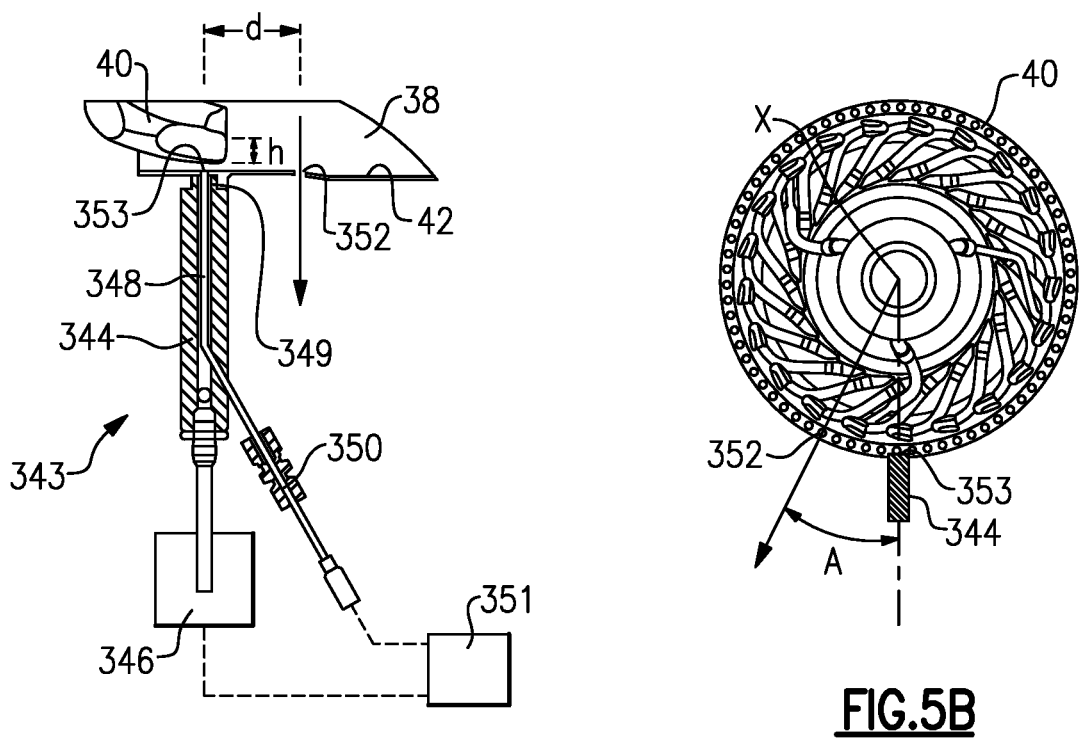
FIG.5A
FIG.5B
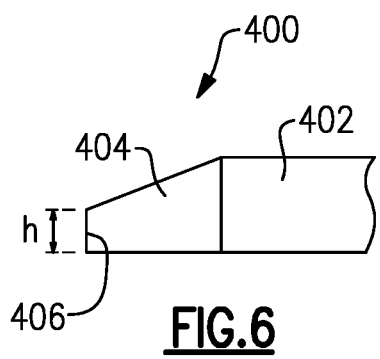
FIG.6

METHOD AND APPARATUS TO MEASURE GAS TURBINE COMPRESSOR EXIT TEMPERATURE

BACKGROUND

This application relates to a method and apparatus for measuring gas turbine compressor exit temperatures.

Gas turbine engines are known, and typically include a compressor compressing air and delivering it into a combustor. The air is mixed with fuel and ignited. Products of this combustion pass downstream over turbine rotors, driving them to rotate. The turbine rotors rotate a compressor rotor and typically another component such as a turboshaft, or a propulsor.

The operation of gas turbine engines is subject to very detailed control. Pressure and temperature readings at several locations in the gas turbine engine are taken and utilized by a control for operational reasons, or design reasons.

One such location is an exit of the compressor. It is somewhat challenging to accurately and efficiently obtain a temperature reading at the exit of a compressor in a gas turbine engine.

SUMMARY

A gas turbine engine includes a compressor section, a combustor and a turbine section. The compressor section has a compressor section exit upstream of the combustor. A probe extends through a compressor exit housing surrounding the compressor section exit. The probe taps air downstream of the compressor section exit into a probe body having a passage leading to a temperature sensor. There is a controlled leakage also allowing air from within the compressor exit housing to leak.

A method of determining a compressor exit temperature include the steps of 1) providing a gas turbine engine with a compressor section, a combustor and a turbine section, 2) tapping air downstream of the compressor section into a probe and from a compressor exit housing surrounding a compressor section exit, and providing a controlled leakage also allowing air from within the compressor exit housing to leak, and 3) delivering the tapped air to a temperature sensor and sensing a temperature of the tapped air.

A test probe includes a probe body having a temperature sensor including a thermocouple extending upwardly through a passage. The passage extends beyond the thermocouple to a pressure sensor. There is a controlled leakage provided from the passage outwardly of the probe body.

These and other features will be best understood from the following drawings and specification, the following is a brief description.

BRIEF DESCRIPTION OF THE DRAWINGS

FIG. 5A shows another embodiment of a pressure and temperature sensor.

FIG. 5B shows another features of the FIG. 5A arrangement.

FIG. 6 shows another embodiment.

DETAILED DESCRIPTION

Figure 1:
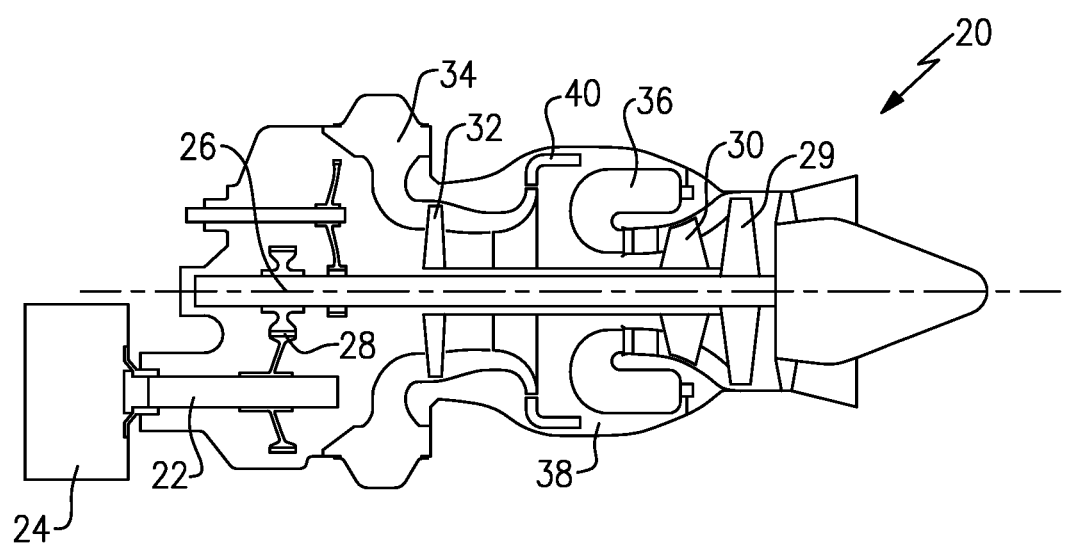
FIG. 1 schematically shows a gas turbine engine illustrated as a turboshaft.

FIG. 1 illustrates a gas turbine engine 20. Gas turbine engine 20 shows a power shaft 22 for driving an accessory 24. Accessory 24 may be a propeller for a helicopter. In addition, the shaft 22 may drive any number of other components. Although the engine 20 is illustrated as a turboshaft, the teaching of this disclosure would extend to turboprops or turbofan gas turbine engines driving a propulsor.

The shaft 22 is driven by a shaft 26 through a gear interface 28. Shaft 26 is driven by a turbine 29. Another turbine rotor 30 is upstream of the turbine rotor 9 and drives a compressor 32. Compressor 32 receives air from an air inlet 34. The compressor 32 delivers air into a combustor 36 where it is mixed with fuel and ignited. Products of this combustion pass downstream over the turbine rotors 30 and then 29, driving the shaft 26 and compressor rotor 32 to rotate.

As mentioned above, an area of interest is area 38 downstream of the compressor 32. A compressor diffuser 40 is positioned downstream of the compressor rotor 32. The temperature at location 38 is known as T3 and the pressure is known as P3. It is important in the design and control of an operational gas turbine engine to know the T3 temperature and P3 pressure accurately. However, there are challenges in obtaining such information.

Figure 2:
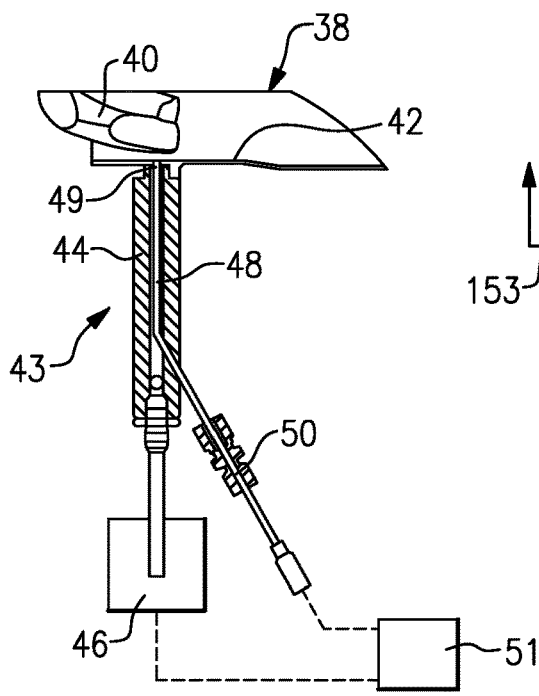
FIG. 2 shows a prior art pressure and temperature sensor.

FIG. 2 shows a prior art probe 43 for obtaining a pressure and temperature at location 38. A housing 42 surrounds the diffuser 40. A probe 43 extends through a wall of the housing 42 and taps air. A probe tube 44 includes an internal passage 48 tapping air from inwardly of the housing 42. The air is delivered to a pressure sensor 46 and to a temperature sensor 50. Sensor 150 includes a thermocouple 49 that extends near, or into, housing 42. Sensors 46 and 50 communicate with a control 51.

The air just inward of the housing 42 is relatively stagnant. This is a good location to obtain accurate pressure measurement. However, Applicant has discovered that temperature measurements are inaccurate and even then, the accuracy varies. This is due to the flow conditions at a boundary layer just inwardly of the housing 42.

The probes as utilized across this disclosure may be test equipment that is removable from the engine after the pressure and temperature have been determined. Alternatively, the probe could be placed within the engine and operate when the engine is actually being utilized to power an aircraft.

Figure 3:
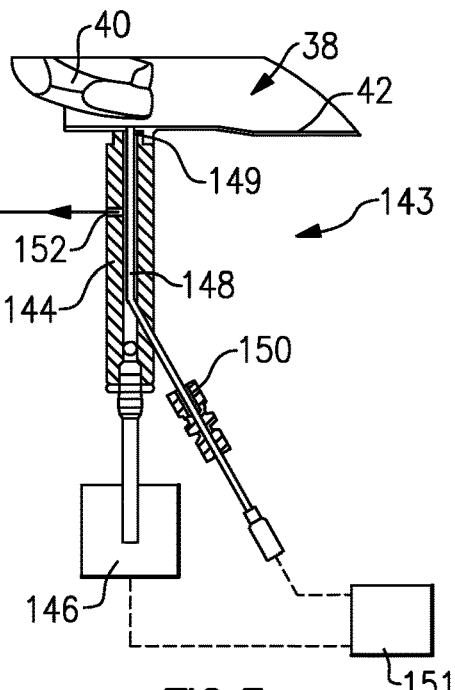
FIG. 3 shows a pressure and temperature sensor according to the present disclosure.

FIG. 3 shows a probe 143 which is operationally similar to the probe 43 shown in FIG. 2. The probe 143 taps air inwardly of the housing 42, and adjacent the exit of diffuser 40. A tube 144 has an internal passage 148 leading to a pressure sensor 146. A temperature sensor 150 also communicates with the air in the passage 148. Temperature sensor 150 includes thermocouple 149. Sensors 146 and 150 communicate with the control 151.

In order to address the stagnant flow inwardly of the housing 42, the embodiment 143 includes a controlled leakage 152. Leakage 152 is at an upstream location in passage 148. A line 153 is shown downstream of the controlled leakage 152. Line 153 may return to flow across the turbine through an appropriate connection. Further, line 153 could be directed to other locations within the engine for other uses. For purposes of this application the term "controlled leakage" would apply to either simply letting the air leak to ambient, or this return scenario.

Since the pressure sensor 146 provides a cap on the passage 148 air does not flow freely from within the housing 42. However, by adding the controlled leakage 152 through the tube 144, the airflow is driven.

Figure 4A:
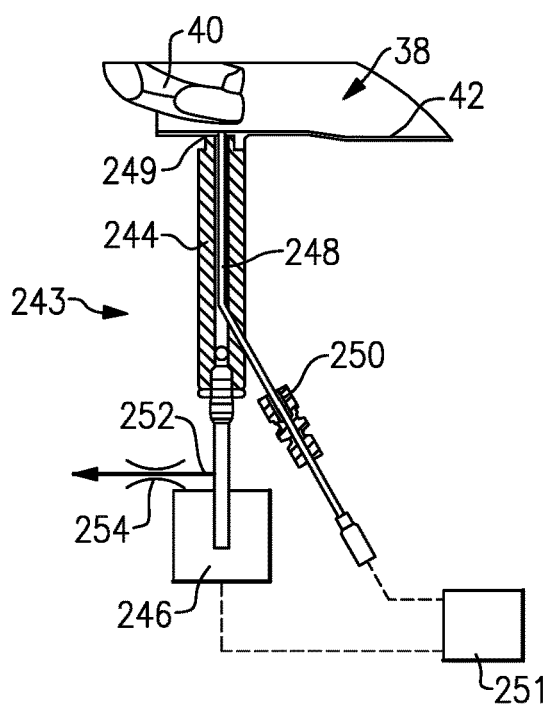
FIG. 4A shows a second embodiment pressure and temperature sensor.

In a second embodiment probe 243 shown in FIG. 4A, the probe body 244 has an internal passage 248 again communicating with a pressure sensor 246 and a temperature sensor 250. The sensors 246 and 250 communicate with a control 251. Again, temperature sensor 250 has a thermocouple 249.

The controlled leakage 252 is now at a more downstream location. The controlled leakage serves a similar function to that of the FIG. 3 embodiment in that it assists in driving the stagnant air inwardly of the housing 42. Fixed orifice 254 is positioned downstream of the controlled leakage 252.

The difference in FIGS. 3 and 4A is subtle and would achieve similar performance in terms of improving T3 accuracy. The FIG. 3 embodiment may have a slightly better time-response due to the smaller volume of air to change as the operating condition of the engine varies.

Figure 4B:
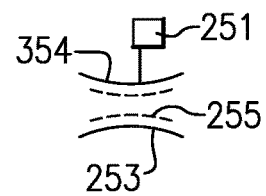
FIG. 4B shows an alternative to the FIG. 4A arrangement.

FIG. 4B shows an embodiment wherein the fixed orifice 254 is replaced with a variable orifice 354 controlled by control 251. The orifice 354 can move between areas 253 and 255 to allow the variable leakage to change relative to engine power.

An objective of this disclosure is to entrain flow towards the sensing element of the temperature sensor to improve the heat-transfer around the sensing element, yielding better measurement accuracy. This improvement is proportional to the absolute flow increase around the sensing element.

At high power, since there is more flow coming out of the compressor, a small orifice can improve the T3 measurement by entraining a given amount of flow towards the temperature sensor.

At low power, the flow out of the compressor is less than at high power and thus, a bigger orifice size may be required to entrain the same amount of flow towards the temperature sensor and have the same improvement in T3 measurement.

A fixed orifice size may provide a good compromise in improved accuracy from low to high power. However, some engine configurations may benefit from actively controlling the orifice size, for example by reducing the orifice size when going from low to high power and vice versa.

FIG. 5A shows another embodiment probe 343. In embodiment 343 there is again a probe body 344 having an internal passage 348 communicating with a pressure sensor 346 and a temperature sensor 350. The sensor 346 and 350 communicate with a control 351.

The controlled leakage 352 is through the housing wall 42, and removed from the probe 343. Notably, a tap 352 for the controlled leakage is spaced from the probe tap 353 by a distance d. In embodiment distance d should be relatively small. As shown, the diffuser 40 may be a pipe diffuser having a height h at its outlet. The distance d is preferably less than 4 h, and in embodiments less than 2 h. In addition, as shown in FIG. 5B, the location of the controlled leakage tap 352 should be within a relatively small angle A from the tap 353 relative to an engine central axis x. As can be appreciated from this Figure, if the controlled leakage is circumferentially spaced from the probe tap 353, the angle A is preferably also such that the distance d is less than 4 h, and in embodiments less than 2 h.

FIG. 6 shows an embodiment 400 wherein an impeller 402 discharges compressed air into a diffuser 404. The diffuser 404 diffuses the air radially outwardly, as opposed to the pipe diffuser of the earlier embodiments. The blade 404 on the diffuser has an exit height 406 which would be the h for this embodiment. The limitations about the distance to the leakage 352 relative to h as mentioned with regard to FIGS. 5A and 5B would also apply to this embodiment. In the FIG. 2 embodiment the air surrounding the probe tap is relatively stagnant and away from the compressor exit flow. This induces relatively large error and scatter in the accuracy when compared to the temperature compressor exit temperatures obtained by the embodiments disclosed above.

However, a small leakage of air does not significantly impact the engine performance and efficiency. Therefore, Applicant has also determined an optimal leakage rate range for which no measurement corrections are required. As one example, the rate might be between 0.01 and 0.2% of a compressor inlet flow. As such, the size of the controlled leakage orifices are such that the air leakage is achieved within the target ratio range relative to compressor inlet flow as mentioned above. In embodiments the range may be between 0.05 and 0.1% of a compressor inlet flow. As is clear, each of the embodiments of FIGS. 3-6 deliver the controlled air leakage away from the probe before the air reaches the pressure sensor.

The impact of the air leakage on engine thermodynamics and the compressor exit temperature may also be compensated for utilizing the following relationship wherein A $T3_{air\_leakage}$ can be determined based on tests and/or analysis.

$$T3 = T3_{measured} - \Delta T3_{air\_leakage}$$

The formula can be used as follows: run the engine at a certain power, with no air leak. i) Measure T3 with temperature sensors installed inside each of the diffuser pipes. This gives one the "true" T3. ii) Measure T3 with "prior art" solution, i.e. per FIG. 2. iii) There will be a difference between the two readings, i.e. ii) vs i), because of the lack of flow surrounding the probe per FIG. 2.

Now run the engine at the same power as above, but now with a small air leak per this disclosure. i) Again, measure T3 using temperature sensors installed inside each of the diffuser pipes. This gives one the "true" T3. ii) Also measure T3 using this disclosure. There will be less difference between these T3s when compared to the T3 difference from the prior art. This is a key benefit of this disclosure.

Now, because there is an air leak, the engine is less efficient and at the same power, the T3 measured per this disclosure will be hotter than that measured in the prior art version. This is not a measurement error, it is a real difference due to different thermodynamics of the engine. If the leak is small, this difference may be negligible. If not, it needs to be compensated for and this is what is called the "Delta T," ΔT, which is the impact of having a P3 leak on the engine performance.

Stated another way, the more air bleed at constant power, the more impact it will have on the real T3 value itself. So, even if one measures correctly, T3 for that alternate condition with bleed, one is still not measuring the T3 for the exact condition that you want (a condition where there would be no bleed). This delta T3 is there to compensate for the fact of the leaking. For a small leak, this delta is negligible.

The disclosed improvements provide minimal intrusion into the engine and can be easily installed on existing engines for production verification testing and/or flight testing while providing accurate and repeatable compressor exit temperature measurement.

A gas turbine engine under this disclosure could be said to include a compressor section, a combustor and a turbine section. The compressor section has a compressor section exit upstream of the combustor. A probe extends through a compressor exit housing surrounding the compressor section exit. The probe taps air downstream of the compressor section exit into a probe body having a passage leading to a temperature sensor. There is a controlled leakage also allowing air from within the compressor exit housing to leak.

In another embodiment according to the previous embodiment, the passage extends to a pressure sensor, and the temperature sensor senses the temperature of the air upstream of the pressure sensor.

In another embodiment according to any of the previous embodiments, the controlled leakage is from the passage through the probe body.

In another embodiment according to any of the previous embodiments, an orifice is positioned downstream of the controlled leakage.

In another embodiment according to any of the previous embodiments, the orifice is fixed.

In another embodiment according to any of the previous embodiments, the orifice is a variable orifice and a size of the variable orifice is modified during engine operation.

In another embodiment according to any of the previous embodiments, the controlled leakage is through the compressor exit housing, and not into the probe body.

In another embodiment according to any of the previous embodiments, an axial distance between a tap into the passage and the controlled leakage is less than 4 times a height of an exit from a diffuser which provides the compressor section exit.

In another embodiment according to any of the previous embodiments, an axial centerline of the engine defines an angle between a circumferential location of the tap to the probe body and the controlled leakage, and the angle is less than a number of degrees that would result in distance d being greater than 4 times the height of the exit from the diffuser that provides the compressor section exit.

In another embodiment according to any of the previous embodiments, the controlled leakage is controlled such that a total amount of leakage is between 0.01 and 0.2% of a volume of air delivered into the compressor section.

In another embodiment according to any of the previous embodiments, the control determines an air temperature at the compressor exit utilizing the following formula, $$T3 = T3_{measured} - \Delta T3_{air\_leakage}$$

A method of determining a compressor exit temperature under this disclosure could be said to include the steps of 1) providing a gas turbine engine with a compressor section, a combustor and a turbine section, 2) tapping air downstream of the compressor section into a probe and from a compressor exit housing surrounding a compressor section exit, and providing a controlled leakage also allowing air from within the compressor exit housing to leak, and 3) delivering the tapped air to a temperature sensor and sensing a temperature of the tapped air.

In another embodiment according to any of the previous embodiments, the tapped air extends to a pressure sensor, and the temperature sensor senses the temperature of the air upstream of the pressure sensor.

In another embodiment according to any of the previous embodiments, the controlled leakage is from a probe body, and downstream of a connection to the temperature sensor.

In another embodiment according to any of the previous embodiments, an orifice is positioned downstream of the controlled leakage.

In another embodiment according to any of the previous embodiments, the controlled leakage is through the compressor exit housing, and not into the probe body.

In another embodiment according to any of the previous embodiments, the control determines an air temperature at the compressor exit utilizing the following formula, $$T3 = T3_{measured} - \Delta T3_{air\_leakage}.$$

In another featured embodiment, a test probe includes a probe body having a temperature sensor including a thermocouple extending upwardly through a passage. The passage extends beyond the thermocouple to a pressure sensor. There is a controlled leakage provided from the passage outwardly of the probe body.

In another embodiment according to any of the previous embodiments, an orifice is positioned downstream of the controlled leakage.

In another embodiment according to any of the previous embodiments, the orifice is a variable orifice and a size of the variable orifice is modified during operation of a gas turbine engine upon which the test probe is being utilized.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:
    a compressor section, a combustor and a turbine section;
    the compressor section having a compressor section exit upstream of the combustor; and
    a probe extending through a compressor exit housing surrounding said compressor section exit, said probe tapping air downstream of said compressor section exit into a probe body having a passage leading to a temperature sensor, and comprising a controlled leakage also allowing air from within the compressor exit housing to leak;
    wherein said passage extending to a pressure sensor, and said temperature sensor sensing the temperature of the air upstream of the pressure sensor, the controlled leakage being delivered away from the probe prior to the air reaching the pressure sensor.

2. The gas turbine engine as set forth in claim 1, wherein said controlled leakage is from the passage through the probe body.

3. The gas turbine engine as set forth in claim 2, wherein an orifice is positioned downstream of the controlled leakage.

4. The gas turbine engine as set forth in claim 3, wherein the orifice is fixed.

5. The gas turbine engine as set forth in claim 3, wherein the orifice is a variable orifice and a size of the variable orifice is modified during engine operation.

6. The gas turbine engine as set forth in claim 1, wherein the controlled leakage is controlled such that a total amount of leakage is between 0.01 and 0.2% of a volume of air delivered into the compressor section.

7. The gas turbine engine as set forth in claim 1, wherein a control determines an air temperature at the compressor exit utilizing the following formula, T3=T3measured−ΔT3air_leakage, wherein T3 is the temperature at the compressor exit.

8. A method of determining a compressor exit temperature including the steps of:
1) providing a gas turbine engine with a compressor section, a combustor and a turbine section;
2) tapping air downstream of the compressor section into a probe and from a compressor exit housing surrounding a compressor section exit, and providing a controlled leakage also allowing air from within the compressor exit housing to leak; and
3) delivering the tapped air to a temperature sensor and sensing a temperature of the tapped air;
wherein said tapped air extending to a pressure sensor, and said temperature sensor sensing the temperature of the air upstream of the pressure sensor, the controlled leakage being delivered away from the probe prior to the air reaching the pressure sensor.

9. The method as set forth in claim 8, wherein the controlled leakage is from a probe body, and downstream of a connection to the temperature sensor.

10. The method as set forth in claim 8, wherein an orifice is positioned downstream of the controlled leakage.

11. The method as set forth in claim 8, wherein a control determines an air temperature at the compressor exit utilizing the following formula, T3=T3measured−ΔT3air leakage, wherein T3 is the temperature at the compressor exit.

12. A test probe comprising:
a probe body having a temperature sensor including a thermocouple extending upwardly through a passage, and the passage extending beyond the thermocouple to a pressure sensor, and comprising a controlled leakage provided from the passage outwardly of the probe body, said temperature sensor sensing the temperature of the air upstream of the pressure sensor, the controlled leakage being delivered away from the probe prior to the air reaching the pressure sensor.

13. The test probe as set forth in claim 12, wherein an orifice is positioned downstream of the controlled leakage.

14. The test probe as set forth in claim 13, wherein the orifice is a variable orifice and a size of the variable orifice is modified during operation of a gas turbine engine upon which the test probe is being utilized.

* * * * *